United States Patent
Mossoba et al.

(10) Patent No.: US 10,637,810 B1
(45) Date of Patent: Apr. 28, 2020

(54) SYSTEM AND METHOD FOR DISTRIBUTED DOCUMENT UPLOAD VIA ELECTRONIC MAIL

(71) Applicant: Capital One Services, LLC, McLean, VA (US)

(72) Inventors: Michael Mossoba, Arlington, VA (US); Abdelkader Benkreira, Washington, DC (US); Joshua Edwards, Philadelphia, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/717,201

(22) Filed: Dec. 17, 2019

(51) Int. Cl.
| | |
|---|---|
| G06F 15/16 | (2006.01) |
| H04L 12/58 | (2006.01) |
| G06K 9/00 | (2006.01) |
| G06F 40/30 | (2020.01) |
| G06F 16/176 | (2019.01) |

(52) U.S. Cl.
CPC ............ *H04L 51/08* (2013.01); *G06F 16/176* (2019.01); *G06F 40/30* (2020.01); *G06K 9/00442* (2013.01); *H04L 51/12* (2013.01)

(58) Field of Classification Search
USPC ........................................................ 709/206
See application file for complete search history.

(56) References Cited

U.S. PATENT DOCUMENTS

| | | | |
|---|---|---|---|
| 7,543,078 B2 | 6/2009 | Sun | |
| 8,171,540 B2 | 5/2012 | Pulfer et al. | |
| 8,219,623 B2 | 7/2012 | Tribble et al. | |
| 8,732,250 B2 | 5/2014 | Nussey et al. | |
| 9,633,026 B2 | 4/2017 | Ahn et al. | |
| 9,886,428 B2 | 2/2018 | Bhogal et al. | |
| 10,009,379 B2 | 6/2018 | Jones | |
| 2002/0188689 A1 | 12/2002 | Michael | |
| 2004/0117451 A1 | 6/2004 | Chung | |
| 2004/0230663 A1* | 11/2004 | Ackerman | ......... H04N 1/00132 709/207 |
| 2005/0044160 A1 | 2/2005 | McElligott | |
| 2005/0055409 A1 | 3/2005 | Alsarraf et al. | |
| 2005/0055415 A1 | 3/2005 | Alsarraf et al. | |
| 2006/0136420 A1 | 6/2006 | Gandhi et al. | |
| 2007/0038709 A1 | 2/2007 | Medvedev et al. | |
| 2007/0094321 A1 | 4/2007 | Nussey et al. | |
| 2007/0094389 A1 | 4/2007 | Nussey et al. | |

(Continued)

*Primary Examiner* — Anthony Mejia

(74) *Attorney, Agent, or Firm* — Hunton Andrews Kurth LLP

(57) ABSTRACT

In a method for distributed upload of documents an upload email address is assigned to a user and associated with a searchable document database accessible by the user via a user device and a network. Sender acceptance criteria are established for the upload email address. An email addressed to the upload email address and having a sender email address is received from an email sender via the network. A determination is made as to whether the received email meets sender acceptance criteria. Responsive to a determination that the email meets sender acceptance criteria, documents attached to the email are identified. Each identified document is associated with a document record comprising a document identifier and a sender identifier associated with the email sender and is stored in the searchable document database with the document record.

20 Claims, 5 Drawing Sheets

(56) References Cited

U.S. PATENT DOCUMENTS

| | | |
|---|---|---|
| 2007/0094390 A1 | 4/2007 | Nussey |
| 2007/0143409 A1 | 6/2007 | Tribble et al. |
| 2007/0143413 A1 | 6/2007 | Tribble et al. |
| 2009/0150497 A1 | 6/2009 | McAfee et al. |
| 2012/0233130 A1 | 9/2012 | Vedachalam et al. |
| 2013/0060863 A1 | 3/2013 | D'Eri et al. |
| 2013/0117393 A1 | 5/2013 | Cohen |
| 2013/0238730 A1* | 9/2013 | Nir .................... H04L 51/08 709/206 |
| 2014/0020044 A1 | 1/2014 | Ayres et al. |
| 2014/0082111 A1* | 3/2014 | Schneider .............. G06Q 10/00 709/206 |
| 2014/0250163 A1* | 9/2014 | Schneider ............... H04L 51/34 709/202 |
| 2015/0047028 A1 | 2/2015 | Mankiewicz |
| 2015/0288646 A1 | 10/2015 | Brauff et al. |
| 2019/0057111 A1* | 2/2019 | Chung .................. G06F 16/168 |

* cited by examiner

SYSTEM AND METHOD FOR DISTRIBUTED DOCUMENT UPLOAD VIA ELECTRONIC MAIL

FIELD OF THE INVENTION

This disclosure relates generally to searchable document storage and control, and more specifically, to systems and methods for receiving and accessibly storing user-related documents at an electronic mail address associated with the user.

BACKGROUND OF THE INVENTION

Loan applicants, tax filers, and other users are often required to submit a variety of documents to supplement an on-line application or other electronic filing. This may require such users to obtain copies of the required documents from various sources, and either mail hard copies to the receiving entity or upload electronic copies (after scanning, if received as hard copies) during an interactive on-line session. Not only is this inconvenient for the user, there is also significant potential for documents to be lost, mishandled, or otherwise compromised.

SUMMARY OF THE INVENTION

An illustrative aspect of the invention provides a method for distributed upload of documents. The method comprises assigning an upload email address to a user and associating the upload email address with a searchable document database accessible by the user via a user device and a network. The method further comprises establishing sender acceptance criteria for the upload email address. The method still further comprises receiving, from an email sender via the network, an email addressed to the upload email address, the email having a sender email address. The method also comprises determining whether the received email meets sender acceptance criteria. Responsive to a determination that the email meets sender acceptance criteria, documents attached to the email are identified. Each such document is associated with a document record comprising a document identifier and a sender identifier associated with the email sender and is stored in the searchable document database with the document record.

Another aspect of the invention provides a system for storing documents received via email. The system comprises a secure document database having stored therein a plurality of documents associated with a user, each document having an associated document record comprising a document identifier and a sender identifier associated with an email sender from whom the document was received. The system further comprises a document intake system comprising an email processor in communication with a network, an email evaluation processor in communication with the email processor, and a document storage processor. The email processor has an email client associated with the user and configured for receiving email messages from document contributors via the network. The email evaluation processor is configured to review an email received from the email processor to determine if the received email meets at least one of the set consisting of predetermined sender acceptance criteria and predetermined rejection criteria. The document storage processor is configured to review a document attached to the received email, create an associated document record, and store the document and the associated document record in the secure document database.

Another aspect of the invention provides a system for distributed upload of documents. The system comprises a plurality of contributor processing systems, each associated with a document contributor, a user device associated with a user, and a secure document database. The secure document database has stored therein a plurality of documents associated with the user, each document having been provided by one of the document contributors and each having an associated document record comprising a document identifier and a contributor identifier. The system further comprises a document intake system comprising an email processor, an email evaluation processor, and a document storage processor. The email processor is in communication with the contributor processing systems via a network and has an email client associated with the user for receiving an email message from a sending document contributor. The email evaluation processor is in communication with the secure document database and is configured to determine if the received email meets at least one of the set consisting of predetermined sender acceptance criteria and predetermined rejection criteria. The document storage processor is configured to, upon a determination that the received email meets the sender acceptance criteria, review a document attached to the received email, create an associated document record and store the document and the associated document record in the secure document database. The system also comprises a document download server in communication with the secure document database and a document requester processing system via the network. The document download processor is configured to receive a document search request from the document requester processing system, the search request including user-specified search criteria. The document download processor is further configured to search the secure document database for stored documents meeting the search criteria and transmit at least a portion of the stored documents meeting the search criteria to the document requester processing system.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

The present invention provides methods and systems that facilitate the gathering from multiple, disparate sources and searchable storage of documents associated with a user. The invention involves the creation of an electronic mail (email) address for the purpose of receiving documents and information associated with the user from multiple providers (sometimes referred to herein as "distributed upload" of user documents and information). The email address is administered by a document reception service that reviews all messages received at the address and compares them with acceptance criteria set by the user to determine if the message and/or enclosed documents should be stored for future access by the user or other entity. Typical reception criteria are based on sender identity, which may be determined from the sender email address or from the content of the message. If the message meets the acceptance criteria, attached documents and, in some cases, content within the message itself, may be stored in a searchable database along with information associated with the document (e.g., type of document, nature of the stored information, date of reception, and identification of the sender). Access to the searchable database may be provided to the user and other entities according to an access list or other criteria set by the user. In some cases, the stored documents and/or the received messages may be accessible via an interface associated with the user account. This could be, for example, a financial services application on a mobile or other user device through which the account holder can access to the messages and/or uploaded documents.

Figure 1:
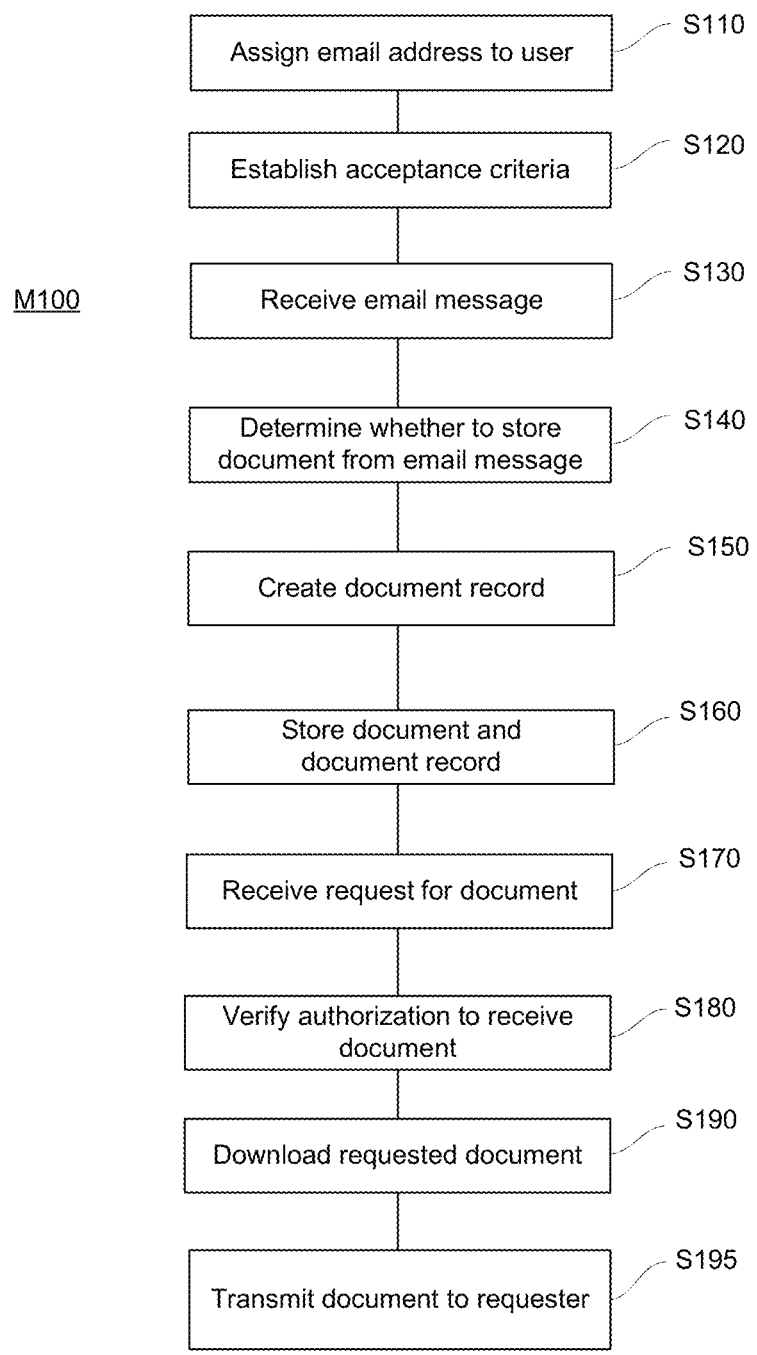
FIG. 1 is a block diagram of actions in a method of facilitating the storage and retrieval of documents associated with a user according to an embodiment of the invention.

FIG. 1 illustrates a basic method M100 of facilitating the storage and retrieval of documents associated with a user according to an exemplary embodiment of the invention. At S110 of the method M100, a unique email address is associated with an individual user by a document uploading service. This service may be associated with a financial institution or other business with which the user may have an account. In some applications, the service may be a stand-alone service requiring registration by the user. In such cases, the email address may be assigned upon completion of the registration process. In cases where the service is provided by an account managing entity and the user is an account holder, the email address may be assigned at the time of creation of the account. In some cases, a user may register with a service specifically for the purpose of receiving documents associated with a particular application or transaction. One example might be a loan application requiring certain documentation. In such cases, the lender may be granted access to some or all of the documentation uploaded via the service. The lender may then use this documentation to process the loan application. Another example could be an insurance application requiring records documenting past medical history. In other cases, a user may register for the service just to have a repository for documents relating to various aspects of the user's life. These could be financial, medical, tax-related, purchase-related or education-related documents, or any other documents or information associated with the user. In another particular example, the service may be associated with a credit card account. In this example, the service might be used to upload documents associated with purchases, which the account administrator could use to take actions in relation to the account.

At S120, the document uploading service establishes acceptance criteria for emails received on the user email account. This may include receiving some or all of the acceptance criteria from the user. As will be discussed in more detail below, acceptance criteria will typically be based on whether the email sender is recognized as a valid provider of information or documents related to the user. The acceptance criteria may be established at the time of assignment of the email address and updated as needed or requested by the user. In some cases, the acceptance criteria may be tied to a specific application or filing. In the case of a loan application, for example, the acceptance criteria may be limited to particular entities known to have copies of the documents required by the lending institution.

In some embodiments, certain acceptance criteria could be specified and updated as needed by the uploading service itself. Such criteria could include, for example, the requirement email pass a virus scan, or that it be in a specified format, previously conveyed to the expected contributors.

At S130 of the method M100, an email directed to the user email address is received by an email server managed by the document uploading service. At S130, an email evaluation processing system reviews the message and makes a determination as to whether documents attached to the email and/or content within the email message itself should be stored. This determination will typically be made using the previously established acceptance criteria. As part of this determination, the server may be required to determine the identity of the sender based on the sending email address and/or the content of the message. The latter may require that the server parse the content of the message. Once the sender's identity is known, the server may compare it to sender-related acceptance criteria. As will be discussed in more detail hereafter, in cases where the sender's identity cannot be determined, other criteria for accepting the email or attached documents may be applied.

Once a determination has been made that the email is to be accepted, a document record is created by a document storage processing system for each relevant attached document at S150. The document record includes information associated with the document and its receipt. The information may include, for example, the type of document, the date of reception, identification of the entity from which it was received, etc. At S160, the document and associated document record are stored by the email evaluation system in a document database, and the uploading process is complete. In some embodiments, the email evaluation system may transmit a notification email to the user identifying the document(s) received. Alternatively or in addition, the evaluation system may transmit a successful upload notification to the sender.

The method M100 may also include a document downloading process that begins at S170 with the receiving, by a document download server, of a document request identifying one or more documents to be downloaded. Such a request may be submitted by the user or by an entity authorized by the user to obtain the requested documents. In some embodiments, the request may be received via email. At S180, the document download server verifies that the requesting entity is authorized to receive the requested document. This may include comparing the requester's identification to a list of authorized entities provided by the user. Alternatively, authorization of the requester may be established by contacting the user and requesting individual verification. Once authorization is verified, the requested document is downloaded from the document database at S190 and transmitted to the document requester S195. In some embodiments, the document may be transmitted by email.

In some embodiments, the action of receiving a document request may be made as part of or as the result of a document search. Such a search may be accomplished via an interactive session with a search server. Alternatively document search criteria may be submitted with a search request sent, for example, via email. In such a case, search results could be provided in a similar manner. The requester could then further request the transmission of a specific document.

Figure 2:
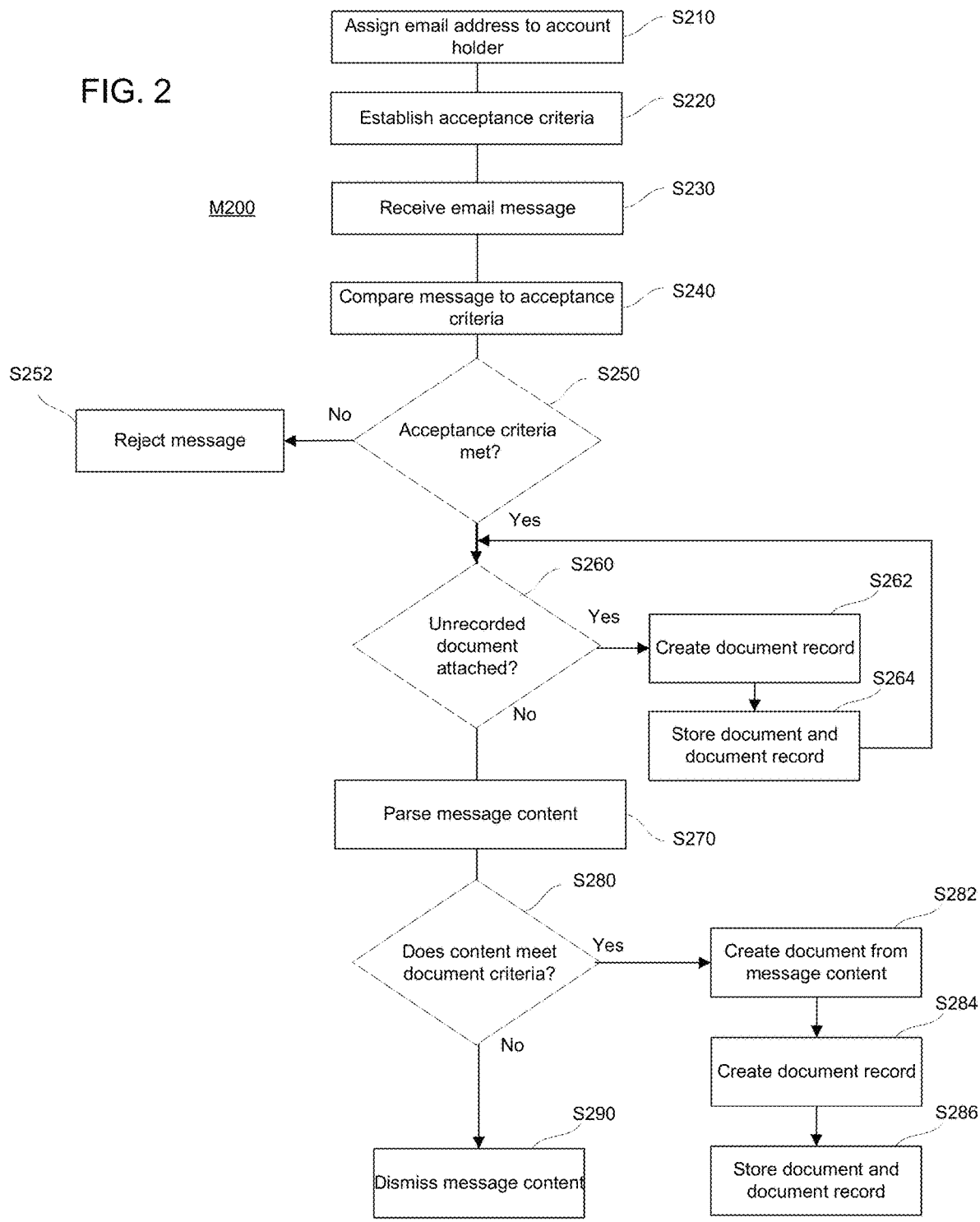
FIG. 2 is a block diagram of actions in a method of distributed upload of documents associated with a user according to an embodiment of the invention.

FIG. 2 illustrates a method M200 for distributed upload of documents associated with a user according to an exemplary embodiment of the invention. In particular embodiments, the user is a holder of an account with a financial or other institution. At S210, a unique email address is associated with the account holder by a service request processing system of a document uploading service. The email address may be assigned upon completion of a service registration process or may be assigned at the time of creation of the account. In particular embodiments, the email address may be assigned upon receiving a request for the document uploading service from the account holder. Such a request may be constructed and transmitted to the service request processing system using an application installed on a user device of the account holder.

At S220, the document uploading service establishes acceptance criteria for emails and documents sent to the account holder email address. The acceptance criteria may be based, at least in part, on input from the account holder. Such input may be provided through an interactive series of communications between the service request processing system and the user device. The action of establishing acceptance criteria may include the construction of a list of pre-approved senders, emails from whom will always be accepted. This "white list" may include document or information providers specifically identified by the account holder and other providers known to be reliable. As will be discussed, additions may be made to the white list as additional document providers are added. In some embodiments, the white list may be made up of entities that have specifically registered with the uploading service providing entity.

The action of establishing acceptance criteria may also include the construction of a list of explicitly dis-approved senders, emails from whom will always be discarded. This "black list" may include document or information providers specifically identified by the account holder, but may be more likely to be providers known to the service as unreliable or that are known spammers. Additions may be also be made to this list as additional document providers are added. In some embodiments, an email from a provider on the blacklist may still be accepted if explicitly approved by the account holder or if the account holder had previously requested that the provider be added to the white list.

In some embodiments, the acceptance criteria may be based on the sending email address itself or a domain of the sending email address. For example, the white or black list may be a list of approved email addresses or domains rather than approved senders. The acceptance criteria can require an exact match of addresses in the list or it may require only partial matches. For example, all domain names including a particular name might be deemed a match, regardless of the domain extension. Similarly, all addresses coming from a specific domain may be deemed a match, regardless of the local-part of the address.

Acceptance criteria may also be based on other factors such as applicability of the content to the account holder. For example, emails with information or documents that are clearly not related to the account holder or an application purpose designated by the user could be dismissed. Other limitations could include document date ranges or content. In some embodiments, the acceptance criteria could include a requirement that acceptance be limited to emails with specific documents or document types, regardless of sender. This would assure that non-relevant emails would not be accepted, even if they are received from white-listed senders. To illustrate this example, a retailer may be provided the email address for the purpose of submitting account holder purchase-related documents (e.g., receipts). The retailer is (at least initially) on the white list. A message sent to the email address is screened to identify its content. If it is determined that the message includes, for example, a sales receipt for an account holder purchase, the email is accepted. If, on the other hand, the message includes only marketing material, it is rejected, regardless of the retailer's white list status.

Once acceptance criteria are established and stored in a database, the email address can be activated and monitored at an email server. At S230, an email message directed to the account holder email address is received by the email server.

Figure 3:
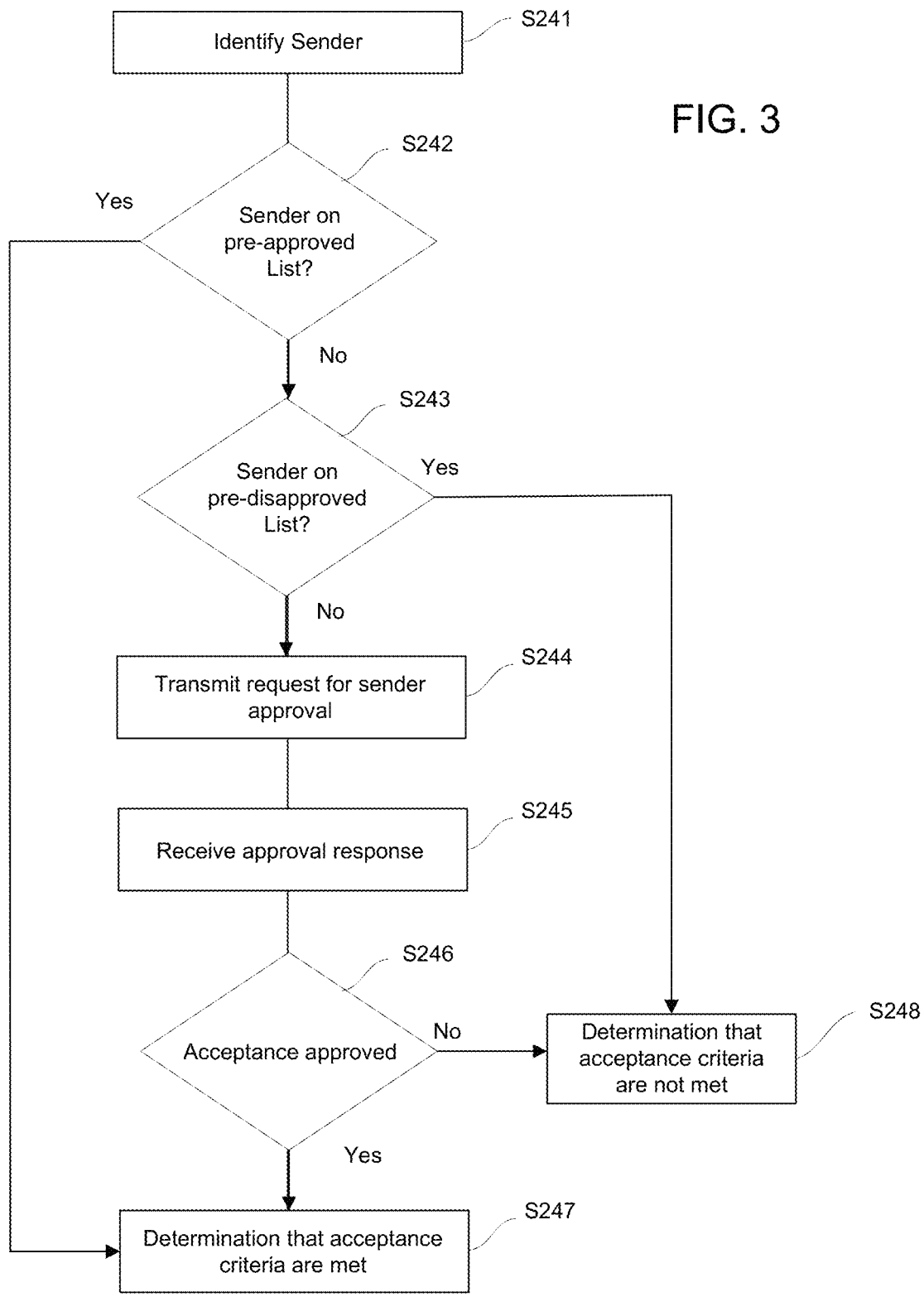
FIG. 3 is a block diagram of actions usable in the methods of various embodiments of the invention.

At S240, the message is compared to the acceptance criteria by an email evaluation system so that a determination can be made at S250 as to whether the message and its content should be accepted. FIG. 3 illustrates a series of actions that may be included in the comparison action of S240 in an exemplary embodiment of the invention when the identity of the sender can be determined. At S241 of this exemplary embodiment, the email evaluation system identifies the sender. This will typically be based on the email address used by the sender. In some cases, however, the email address may not be recognized. In such cases, the email evaluation service may be required to make a determination based on the content of the message. If unable to do so, the email evaluation system may be required to dismiss the email or to use other criteria to determine its acceptability. At S242, the email evaluation system determines whether the sender is on the pre-approved (white) list. If so, the method immediately passes to a conclusion that acceptance criteria have been met at S247. If not, the email evaluation system determines whether the sender is on the dis-approved (black) list. If so, the method immediately passes to a conclusion that acceptance criteria are not met at S248. It will be understood that the order in which the white and black list comparisons are made could be reversed. If the sender is not on either list, the email evaluation system may use other criteria for determining whether to accept the email. Alternatively, the server may transmit a request for approval to the account holder (or other authorized authority) at S244. The request would identify the sender and may include additional information related to the received email. In some embodiments, the request may ask only for approval (or refusal) of acceptance of the received email. In other embodiments, the request may ask whether to accept (or refuse) the current email and whether the account holder wishes to accept (or decline) all future emails from the sender. The request may be transmitted to one or more user devices associated with the account holder. At S245, the server receives a response to the approval request. The response may include an indication that the current email should be accepted or declined. It may also include an indication as to whether all future emails from the sender should be accepted or declined. If the account holder indicates in the response that all future emails from the sender should be accepted or refused, the email evaluation system may add the sender to the white list or the black list, as appropriate. At S246, the email evaluation system makes a determination as to acceptance of the current email based on the account holder's response to the approval request. If the determination is positive, the acceptance criteria are deemed to have been met at S247. If the determination is negative, the acceptance criteria are deemed not to have been met at S248.

As previously noted, in instances where a sender cannot be identified or sender approval/disapproval cannot be obtained, the email evaluation system may be required to use other criteria for determination of email acceptability. This can include running standard "spam" checks. It can also include verification that the email actually contains information or documents related to the account holder and/or a predetermined or preconfigured application purpose (e.g., purchase-related or loan application-related documents).

Returning to FIG. 2, a determination at S250 that acceptance criteria are not met results in the email message being rejected at S252. This may include deletion or other disposition of the email. No further evaluation of the information in the message is done. A determination at S250 that acceptance criteria are met results in the method passing to a determination at S260 as to whether the message has one or more documents attached. This determination and subsequent actions may be carried out by a document storage processing system. The action at S260 may include a determination as to whether the attached document or documents has/have previously been stored. For each unrecorded document, a new document record is created at S262. The document record may include information such as the title or date of the document, the type of document, document format (e.g., jpeg, png, pdf, gif, etc.) the date of reception, identification of the entity from which it was received, or any other searchable information that could be used to identify and retrieve the document. The record may also be or include a searchable version of the document itself. This version may be created from the document, e.g., using OCR or other methods. At S264, the document and the associated document record are stored in a searchable document database. Metatags may be added to either or both to assist in searching. The sequence of actions S260, S262, and S264 may be repeated until all attached documents have been reviewed and/or stored. At S270 and S280, the email message itself may be parsed and evaluated to determine whether it should be treated as a document. The determination may be based on pre-established criteria, which may include, for example, whether the message includes specified information relating to the account holder. In some embodiments, the message may be compared to a standard submission template from which information may be drawn.

If the message does not meet the document criteria, the message content may be dismissed at S290. This may include deletion of the email in its entirety. If the message meets the document criteria, a document may be created from the message content at S282. At S284, a document record may be created for the newly created document, and both are stored in the searchable database at S286.

Access to the documents in the document database would be substantially similar to that described above in conjunction with the method M100.

Figure 4:
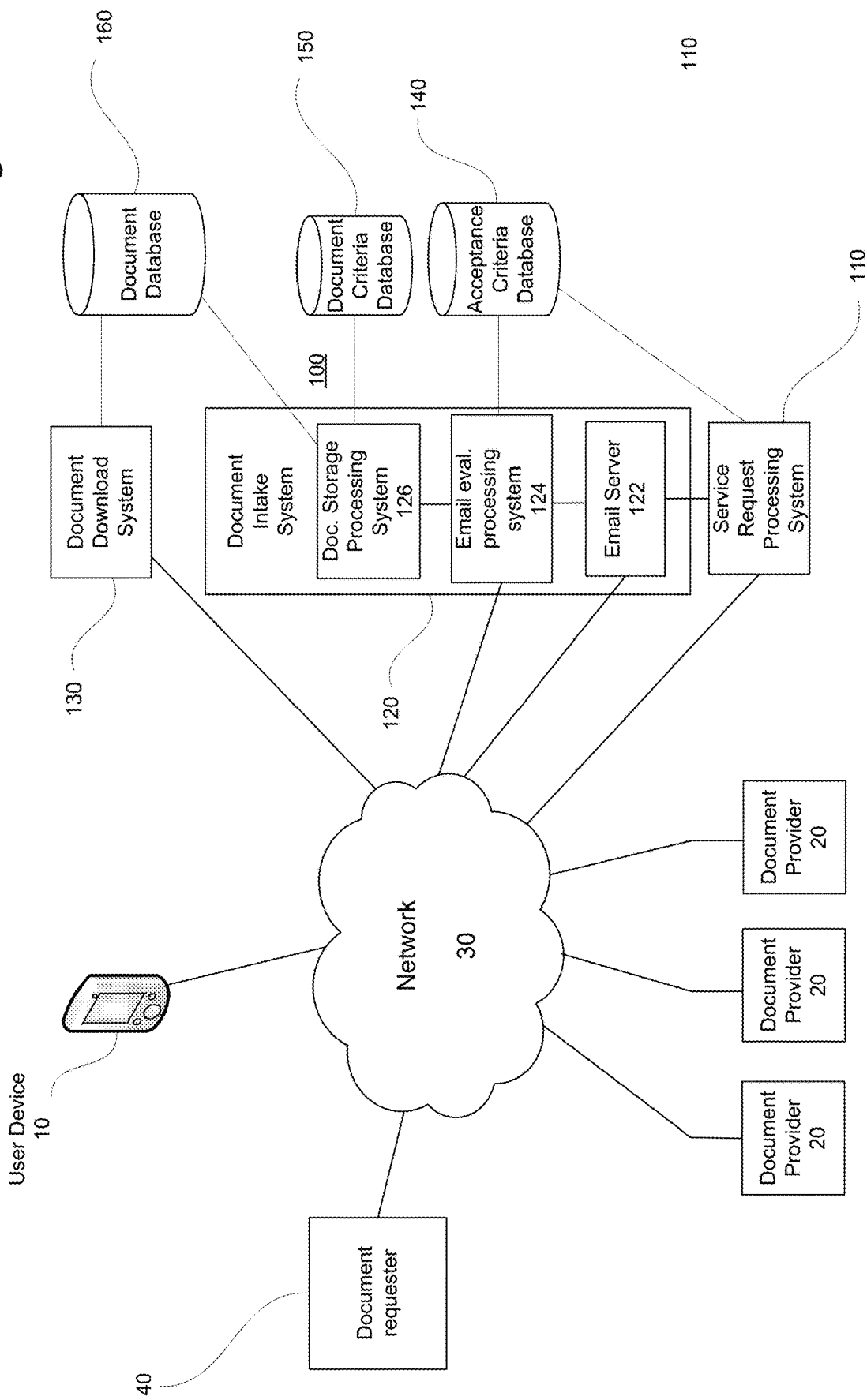
FIG. 4 is a schematic representation of a document storage and retrieval system according to an embodiment of the invention.

FIG. 4 depicts a document storage and retrieval system 100 that can be used to implement methods according to various embodiments of the invention. The system 100 may include various network-enabled computer systems, including, a service request processing system 110, a document intake system 120, and a document download system 130. Each of these systems is configured for communication over a communication network 30. Also connected to the network 30 are a user device 10 associated with an account holder or other user of the system 100, and network enabled systems of a document requester 40 (e.g., an application processing authority or other entity that the account holder wishes to have access to documents stored using the system 100), and one or more document providers 20 from whom the account holder has requested documents associated with the account holder.

As referred to herein, a network-enabled computer system and/or device may include, but is not limited to any computer device, or communications device including, a server, a network appliance, a personal computer (PC), a workstation, and a mobile processing device such as a smart phone, smart pad, handheld PC, or personal digital assistant (PDA). Mobile processing devices may include Near Field Communication (NFC) capabilities, which may allow for communication with other devices by touching them together or bringing them into close proximity.

The network-enabled computer systems used to carry out the methods of the invention may execute one or more software applications to, for example, receive data as input from an entity accessing the network-enabled computer system, process received data, transmit data over a network, and receive data over a network. The one or more network-enabled computer systems may also include one or more software applications to notify an account holder based on transaction information. It will be understood that the depiction in FIG. 4 is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 1.

In the example embodiments presented herein, an account holder may be any individual or entity holding an account. An account may be held by any place, location, object, entity, or other mechanism for holding money or performing transactions in any form, including, without limitation, electronic form. An account may be, for example, a credit card account, a prepaid card account, stored value card account, debit card account, check card account, payroll card account, gift card account, prepaid credit card account, charge card account, checking account, rewards account, line of credit account, credit account, mobile device account, or mobile commerce account. The account holder may be a transaction processing entity such as a financial institution, credit card provider, or other entity that offers accounts to customers. An account may or may not have an associated card, such as, for example, a credit card for a credit account or a debit card for a debit account. The account card may be associated or affiliated with one or more social networking sites, such as a co-branded credit card.

The service request processing system 110 is a network-enabled computer system configured to initialize the document uploading service for an account holder or other user wishing to use the system 100. The service request processing system 110 is configured for communication via the network 30 and may be configured to receive a document service request from a user device 10 via the network. Such a request may be received via email, a web-based application, or through an application installed on the user device 10. The service request processing system 110 may be further configured to determine whether the requesting user device 10 is associated with an existing account, associate the user device 10 with an existing account, or establish a new account to be associated with the user device 10. The service request processing system 110 can also be configured to receive a request from an account management entity to initialize the service for a new account holder.

Upon initialization of service for an account holder, the service request processing system 110 associates a unique email address administered by the document intake system 120 with the account holder and establishes acceptance criteria for emails and documents sent to that email address. As discussed above, the acceptance criteria may be based, at least in part, on input from the account holder. Such input may be provided through an interactive series of communications between the service request processing system 110 and the user device 10. The service request processing system 110 may be configured to construct initial white and black lists that can be stored along with other acceptance criteria in an acceptance criteria database 140. In some embodiments, the acceptance criteria database 140 may include a separate approved sender (white) database and/or a separate disapproved sender (black) database.

The service request processing system 110 may be configured to receive criteria for establishing authorization to download documents transmitted to the account email address. Such criteria may include a list of authorized requesters provided or approved by the account holder.

The document intake system 120 includes an email server 122 on which emails to the account email address are received. Received emails are monitored and evaluated by an email evaluation processor 124. The email evaluation processor 124 is configured to review emails received from the email processor 122 to determine if they and/or documents attached to the emails meet acceptance criteria. The email processor may be configured to determine the sender/document contributor and/or other characteristics of a received email and compare them to acceptance criteria retrieved from the acceptance criteria database 140. In some embodiments, the email evaluation processor 124 may be configured to communicate with the user device 10 via the network 30 to receive account holder input in evaluating an email or sender. For example, the email evaluation processor 124 may be configured to receive from the user device 10 indications as to whether an email sender should be added to the approved sender database or the disapproved sender database or whether a one-time acceptance or rejection should be made. In response to account holder input, the email evaluation processing system may be configured to add a sender to the approved or disapproved sender list in the acceptance criteria database 140.

The document intake system 120 also includes a document storage processing system 126 that is configured to receive accepted documents from the email evaluation processing system 124. The document storage processing system 126 is further configured to review each document, create an associated document record, and store the document and the associated document record in a secure document database 160. The document storage processing system 126 may apply a character recognition application to the document to create a searchable document. It may further search the document for key words matching any of a set of predetermined document-association terms and include the matching key words in the document record.

The document storage processing system 126 may further be configured to receive accepted emails and determine if they meet predetermined document criteria. Such predetermined criteria may be stored in a document criteria database 150. If an email meets the document criteria, the document storage processor 126 creates a new document and an associated document record and stores them in the secure document database 160.

The document download system 130 may be configured for communication with the user device 10 and one or more document requesters 40 over the network. The document download system 130 may, in particular, be configured for receiving a document request from the user device 10 (e.g., via an account services app) or a requester 40. The document request may include an identifier associated with the account or the account holder, the identity of the requester, and a description of the document(s) or criteria for locating the requested document(s). The document download system 130 may be configured to verify authorization of the requester based on information received in the request (e.g., by comparing the name of the requester to a list of authorized requesters). In some embodiments, the document request may include or be in the form of a search request having associated search criteria. The document download system 130 may be configured to respond to the document request by searching the document database 160 for documents meeting criteria established by the request, retrieving one or more documents meeting the criteria from the document database 160, and transmitting the document or documents to the requester.

In some embodiments, searchable access may be provided to a requester via one or more applications or microservices at the account provider to provide enhanced account functionality. Access by the account holder may be accomplished via an application-based interface provided by the account administrator or the service provider.

Figure 5:
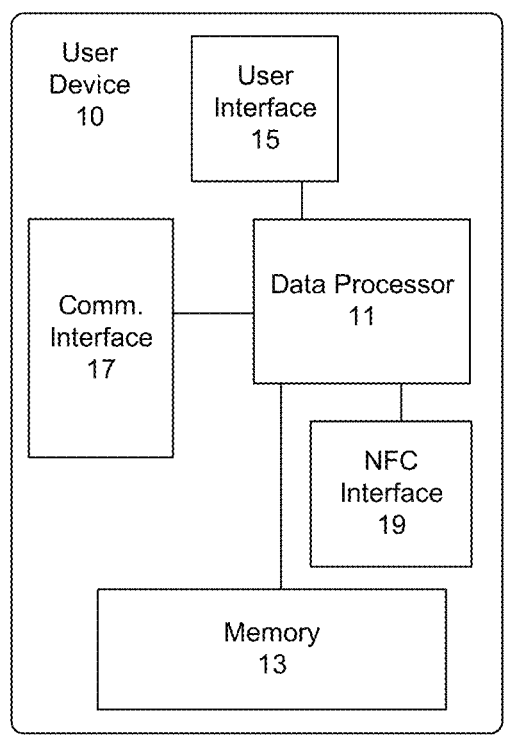
FIG. 5 is a schematic representation of a user processing device usable in conjunction with methods of the invention.

With reference to FIG. 5, an account holder (or other user) processing device 10 may be any data processing and/or communication device that an account holder uses to carry out a transaction and/or to communicate with an application processing authority or the document storage and retrieval system 100 including, but not limited to a smartphone, a laptop, a desktop computer, and a tablet. In particular embodiments, the account holder device 10 includes an on-board data processor 11 in communication with a memory module 13, a user interface 15, and a communication interface 17. The data processor 11 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 13 can be a read-only memory, write-once read-multiple memory or read/write memory, e.g., RAM, ROM and EEPROM, and the user device 10 can include one or more of these memories.

The user interface 15 includes a user input device or mechanism 18, which can be any device for entering information and instructions into the account holder device 10, such as a touch-screen, keyboard, mouse, cursor-control device, microphone, stylus, or digital camera. The user interface 15 may also include a display 19, which can be any type of device for presenting visual information such as a computer monitor, a flat panel display, and a mobile device screen, including liquid crystal displays, light-emitting diode displays, plasma panels, and cathode ray tube displays.

The communication interface 15 is configured to establish and support wired or wireless data communication capability for connecting the device 10 to the network 30 or other communication network. The communication interface 15 can also be configured to support communication with a short-range wireless communication interface, such as near field communication, radio-frequency identification, and Bluetooth, through communication interface 215, along with radio transmissions.

In embodiments of the invention, the memory 13 may have stored therein one or more applications usable by the data processor 11 to conduct and/or monitor transactions between the account holder device 10 and a merchant device 20 or other device over the network 30. These applications may include instructions usable by the data processor 11 to identify transaction events, store event data in the memory 13, and communicate event data to a transaction processor. In certain embodiments, the memory 13 may have stored therein an application associated with a user account for facilitating the use of the document storage and retrieval system 100. This application may include instructions to receive user input from the account holder via the user interface 15 that can be used to construct a document service request and to construct the request and transmit it to the service request processing system 110. The application may be configured to receive queries from the service request processing system 110, to receive responsive information from the account holder, and to transmit the responsive information to the service request processing system. Information requested or otherwise provided by the user may include information on acceptable (or unacceptable) document providers or other email acceptance criteria and information on authorized document requesters. The application may also be configured to construct and transmit a document request based on information received from the account holder or other user of the device 10. The document request may include identification of a specific document or search criteria usable by the document download system 130 to identify one or more applicable documents. The application may also be configured to receive a request response including one or more requested documents. Alternatively or in addition, the document request may include an address or other identification of a recipient to which the document(s) should be transmitted by the download system 130.

The present invention provides the capability for a user to have documents from multiple sources be gathered in a single secure location for distribution only to authorized recipients. The use of email to accomplish this is a significant improvement in that it allows the system to be used by relatively unsophisticated document providers and recipients while allowing the account holder to maintain control over who can provide and who can receive documents. The system also avoids limitations due to specific document or information formats.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A method for distributed upload of documents, the method comprising:
    assigning an upload email address to a user,
    associating the upload email address with a searchable document database accessible by the user via a user device and a network;
    establishing sender acceptance criteria for the upload email address;
    receiving, from an email sender via the network, an email addressed to the upload email address, the email having a sender email address;
    determining whether the received email meets sender acceptance criteria;
    responsive to a determination that the email meets sender acceptance criteria,
        identifying any documents attached to the email, and for each document attached to the email,
            associating said document with a document record comprising a document identifier and a sender identifier associated with the email sender,
            storing the document and the document record in the searchable document database.

2. A method according to claim 1 further comprising:
    establishing sender rejection criteria for the upload email address; and
    responsive to a determination that the email does not meet sender acceptance criteria,
        determining whether the received email meets sender rejection criteria, and
        responsive to a determination that the email meets sender rejection criteria, deleting the email.

3. A method according to claim 2 wherein the sender rejection criteria are established so as to have been met upon the occurrence of one of the set of:
    the sender email address exactly matching one of a set of disapproved email addresses;
    at least a portion of a local-part of the email address matching one of a set of dis-approved address portions; and
    a domain portion of the sender email address matching one of a set of dis-approved email address domains.

4. A method according to claim 2 further comprising:
    responsive to a determination that the email does not meet sender rejection criteria,
        transmitting, to a user device associated with the user via the network, a sender approval request, the request including an identification of the email sender;
        receiving from the user device via the network, a request response including an acceptance instruction selected from the set consisting of
            accept the current email only,
            accept the current email and all future emails from the email sender,
            decline the current email only, and
            decline the current email and all future emails from the email sender
        responsive to the request response including an instruction to accept the current email only,
            carrying out the actions to be carried out responsive to a determination that the email meets sender acceptance criteria,
        responsive to the request response including an instruction to accept the current email and all future emails from the email sender,
            amending the sender acceptance criteria so that future emails from the email sender meet the acceptance criteria, and
            carrying out the actions to be carried out responsive to a determination that the email meets sender acceptance criteria,
        responsive to the request response including an instruction to reject the current email only, deleting the email,
responsive to the request response including an instruction to reject the current email and all future emails from the email sender,
amending the sender rejection criteria so that future emails from the email sender meet the rejection criteria, and
deleting the email.

5. A method according to claim 1 wherein the sender acceptance criteria are established so as to have been met upon the occurrence of one of the set of:
the sender email address exactly matching one of a set of approved email addresses;
at least a portion of a local-part of the email address matching one of a set of approved address portions; and
a domain portion of the sender email address matching one of a set of approved email address domains.

6. A method according to claim 1,
wherein the action of determining whether the received email meets sender acceptance criteria includes determining a sender identifier associated with the email, and
wherein the sender acceptance criteria are established so as to have been met upon the occurrence of the sender identifier matching one of a list of approved sender identifiers.

7. A method according to claim 1 further comprising responsive to a determination that the email meets sender acceptance criteria:
for each document attached to the email,
applying a character recognition application to said document to create a searchable document,
searching the searchable document for key words matching any of a set of predetermined document-association terms, and
adding the matching key words to the document record associated with said document.

8. A method according to claim 7 further comprising responsive to a determination that the email meets sender acceptance criteria:
for each document attached to the email,
adding the searchable document to the document record associated with said document.

9. A method according to claim 7 further comprising responsive to a determination that the email meets sender acceptance criteria:
for each document attached to the email,
inferring a document category from the matching key terms, and
adding the document category to the document record associated with said document.

10. A method according to claim 1 further comprising:
receiving a document search request from a user device associated with the user, the search request including user-specified search criteria;
searching the searchable document database for stored documents meeting the search criteria; and
transmitting at least a portion of the stored documents meeting the search criteria to the user device.

11. A system for storing documents received via email, the system comprising:
a secure document database having stored therein a plurality of documents associated with a user, each document having an associated document record comprising a document identifier and a sender identifier associated with an email sender from whom the document was received;
a document intake system comprising
an email processor in communication with a network and having an email client associated with the user and configured for receiving email messages from document contributors via the network,
an email evaluation processor in communication with the email processor, the email evaluation processor being configured to review an email received from the email processor to determine if the received email meets at least one of the set consisting of predetermined sender acceptance criteria and predetermined rejection criteria,
a document storage processor configured to
review a document attached to the received email, and
create an associated document record and store the document and the associated document record in the secure document database.

12. A system according to claim 11 further comprising:
a document download server in communication with the secure document database and with a user device associated with the user via the network, the document download processor being configured to
receive a document search request from the user device, the search request including user-specified search criteria;
search the secure document database for stored documents meeting the search criteria; and
transmit at least a portion of the stored documents meeting the search criteria to the user device.

13. A system according to claim 11 further comprising:
wherein the document storage processor is configured to carry out the actions to review documents, create an associated document record and store the document and the associated document record only upon a determination by the email evaluation processor that the received email meets the predetermined sender acceptance criteria.

14. A system according to claim 13 further comprising:
an approved sender database having stored therein a list of approved document contributors,
wherein the email evaluation processor is in communication with the approved sender database and is configured to, as part of the action to determine if the received email meets predetermined sender acceptance criteria, determine if a received email was sent by one of the approved document contributors.

15. A system according to claim 11 further comprising:
a disapproved sender database having stored therein a list of disapproved document contributors,
wherein the email evaluation processor is in communication with the disapproved sender database and is configured to, as part of the action to determine if the received email meets predetermined sender rejection criteria, determine if a received email was sent by one of the disapproved document contributors.

16. A system according to claim 11 wherein the document storage processor is further configured to:
apply a character recognition application to the document to create a searchable document,
search the searchable document for key words matching any of a set of predetermined document-association terms, and
include the matching key words in the document record associated with the document.

17. A system according to claim 16 wherein the document storage processor is further configured to:

store the searchable document in the secure document database.

18. A system according to claim 11 wherein the email evaluation processor is further configured to:
upon a determination that the received email does not meet the predetermined sender acceptance criteria and does not meet the predetermined rejection criteria,
transmit, to the user device via the network, a sender approval request, the request including an identification of a sender of the received email,
receive from the user device via the network, a request response including an acceptance instruction, and
process the received email in accordance with the acceptance instruction.

19. A system according to claim 18 wherein the request response further includes a criteria amendment instruction and the email evaluation processor is further configured to amend one of the set consisting of the sender acceptance criteria and the sender rejection criteria in accordance with the criteria amendment instruction.

20. A system for distributed upload of documents, the system comprising:
a plurality of contributor processing systems, each associated with a document contributor;
a user device associated with a user;
a secure document database having stored therein a plurality of documents associated with the user, each document having been provided by one of the document contributors and each having an associated document record comprising a document identifier and a contributor identifier;
a document intake system comprising
an email processor in communication with the contributor processing systems via a network and having an email client associated with the user for receiving an email message from a sending document contributor,
an email evaluation processor in communication with the secure document database, the email evaluation processor being configured to determine if the received email meets at least one of the set consisting of predetermined sender acceptance criteria and predetermined rejection criteria,
a document storage processor configured to, upon a determination that the received email meets the sender acceptance criteria, review a document attached to the received email, create an associated document record and store the document and the associated document record in the secure document database; and
a document download server in communication with the secure document database and a document requester processing system via the network, the document download processor being configured to
receive a document search request from the document requester processing system, the search request including requester-specified search criteria;
search the secure document database for stored documents meeting the search criteria; and
transmit at least a portion of the stored documents meeting the search criteria to the document requester processing system.

* * * * *